May 27, 1952 — E. KRIMSKY — 2,598,272
LENS OR GLARE SHIELD ATTACHMENT FOR SPECTACLES
Filed Jan. 4, 1949
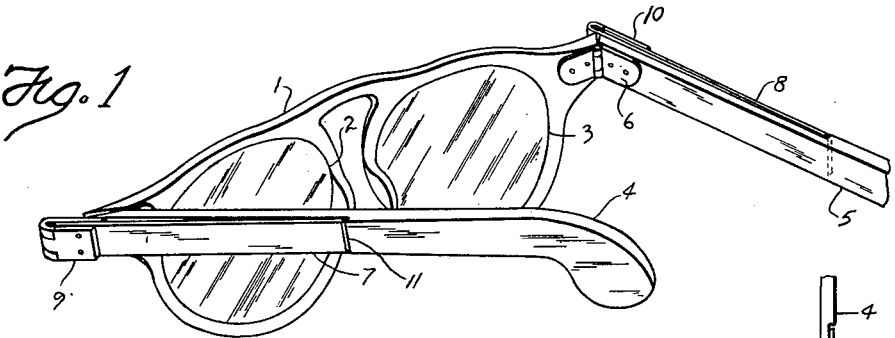
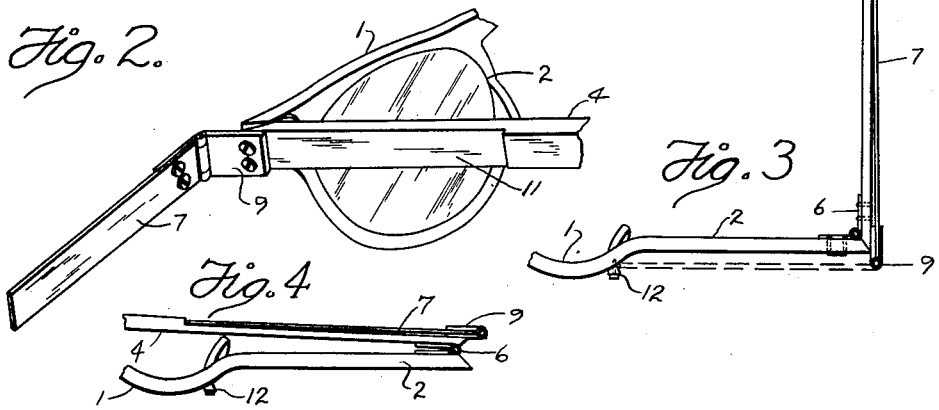
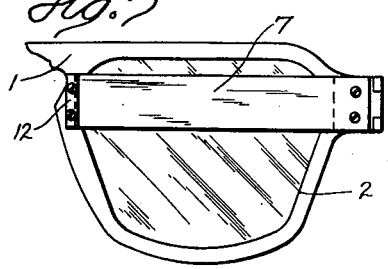
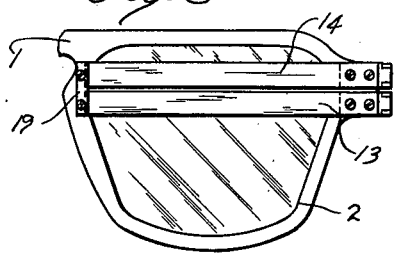
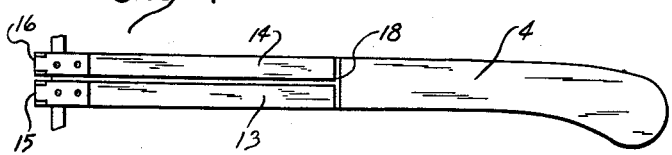
EMANUEL KRIMSKY
INVENTOR.
BY Beale and Jones
ATTORNEYS Patented May 27, 1952

2,598,272

UNITED STATES PATENT OFFICE 2,598,272

LENS OR GLARE SHIELD ATTACHMENT FOR SPECTACLES

Emanuel Krimsky, Brooklyn, N. Y.

Application January 4, 1949, Serial No. 69,123

4 Claims. (Cl. 88—41)

My invention relates to a novel form of auxiliary lens or glare shield attachment for spectacles and more particularly to a lens attachment adapted to be applied to and used with a spectacle frame that is provided with a relatively wide type or form of temple bar which, recently, has come into common use.

Various and numerous forms of glare shield attachments for spectacles have been proposed as shown by the prior art. The most common type embodies some form of shield hinged at some point on the upper edge of the spectacle frame or hinged to swing on the same pivot on which the temple bar is mounted. It has been proposed also to secure fixedly a shield either permanently or detachably mounted on one or on both of the temple bars adjacent the front or pivoted end thereof with no provision for pivotal movement on the respective bar.

Such prior art devices have not proved to be practical and, furthermore, are unsightly. Some of the prior art devices, considered as attachments, require material modification of the spectacle frame which involves considerable expense.

According to the present invention, it is proposed to secure pivotally a glare shield, or if desired, an auxiliary or bi-focal lens, directly to the outer lateral face of the temple bar with the pivotal point of the attaching hinge positioned at a point in advance of the transverse spectacle lens plane in a manner to permit the shield or lens to be swung from its inoperative position folded against the bar to an operative position wherein it will extend across the lens in proper position in front of the pupil of the eye of the user.

I have found that it is practical to make use of a relatively narrow strip of glare shield material of the plastic type which strip, when rotated to a position in front of the pupil of the eye of the wearer, will function in a satisfactory manner to reduce glare effects. With the use of such narrow strip, a relatively small shift of pupil position or head position will permit the eye to function in an unshielded manner.

In a modified form, I propose to mount an auxiliary lens, very similar in shape to the glare strip described, in position just below the glare strip. Such lens is preferably mounted on a separate pivot so that the glare shilde and auxiliary lens may be used selectively. This auxiliary lens may be formed to function as the lower lens as now used on a common type of bi-focal spectacle lens. The use of such an auxiliary lens will afford the wearer the benefit of a second lens that can be used when it is desired, if necessary, to correct his vision say for reading or other close observation.

The main object of this invention is to provide a novel form of glare shield or lens adapted to be mounted directly on the outer lateral surface of a wide temple bar in a manner to permit such shield to be moved to an operative position in front of the spectacle lens to occupy a relatively narrow zone in advance of the pupil of the eye.

Another object is to provide a glare shield that may be rotated to an inoperative position close to the temple bar and to be practically concealed by such bar.

A further object is to provide a special means, in a narrower form of the invention, to conceal more fully the glare shield by providing a recess in the temple bar to receive the shield when not in operation.

A further object is to provide a glare shield that is very economical to construct, very practical in use, and which may be mounted on a spectacle frame with a minimum of alteration thereof.

In the accompanying drawings:

Figure 1 is a view, in perspective, of a spectacle frame showing a strip type of glare shield pivotally mounted on each temple bar.

Figure 2 is a fragmentary view showing one temple bar and shield displaced towards its operative position.

Figure 3 is a view showing in dotted line the shield in operative position in front of a lens.

Figure 4 is a view showing a temple bar and shield in completely folded position.

Figure 5 is a view, in front elevation, showing the glare shield strip in position in front of a spectacle lens.

Figure 6 shows a modification wherein a glare shield strip and a strip type of auxiliary lens are mounted on a temple bar to swing to the front of a lens.

Figure 7 is another view of the device of Figure 6 showing both lens strips folded to inoperative position in a recess on a temple bar.

Referring to Figures 1 to 5, the spectacle frame 1 is provided with the usual lenses 2 and 3. A pair of temple bars 4 and 5 of the relatively wide type are hinged to the main frame by hinges 6.

The glare shield strips 7 and 8 corresponding in width to substantially that of the temple bar are mounted, one on each bar by hinges 9 and 10. It will be noted best in Figure 3 that the pivot of each hinge 9 and 10 is positioned well in front of the transverse plane of a lens 2 in a manner to permit the glare shield to swing from its folded position against a temple bar to an operative position in advance of a lens as 2, as best shown in Figure 5. To render the device more practical, each bar 4 and 5 may be recessed at 11 so that an associated strip may be received in a recess in a manner to conceal the strip more fully. As shown in Figure 5 a detent 12 on the main frame 1 functions to engage the free end of each strip to retain the strip better in its operative position.

Figure 4 shows the spectacle frame folded to an inoperative position with a glare strip also folded against its respective temple bar.

Figures 6 and 7 show a modification wherein an auxiliary lens 13 and a glare strip 14 may be mounted respectively by hinges 15 and 16 on a temple bar 4 to be received in a recess 18 formed in this bar. The lens 13 may be ground to give any desired correction to an eye needing it and this lens may be made from plastic material in a well known manner. A detent 19 may be used to lock the strips in operative position.

The operation of the device disclosed is so simple as to be already apparent from the foregoing description. The spectacle disclosed is intended to be used in a normal manner at which time the glare shields remain folded against their respective temple bars substantially concealed within a respective recess 11. Since the strip and bar are substantially equal in width, no portion of the strip will protrude in a manner to be unsightly or offer projections that might cause trouble. One or both shields may be rotated quickly to an operative position to reduce glare; but, at the same time, permit use of the normal lens by shifting the pupil relative to a respective shield.

An additional advantage is offered by mounting an auxiliary lens 13 just below or above each glare shield. The shield and auxiliary lens may be used selectively. The lens 13 may give additional magnification say for close vision in a manner that a lens 2 or 3 each with a lens as 13 will serve as a bifocal lens pair.

While it is disclosed that the temple bar and shield widths are substantially equal, the width of the bar is not a critical factor. For practical operation, the width of a glare strip or auxiliary lens should be from two to four times as great as the vertical width of the pupil; or, as compared with the spectacle lens, the width of this strip could vary from one-eighth to one-fourth the vertical diameter of the lens. In any case, however, a major portion of the lens is not covered by the strip so that this portion is available for normal vision above or below the strip. If the width of the strip is made a minimum, it may require greater effort to maintain the pupil covered by the strip, hence it may be found more desirable to make the strip appreciably wider than the pupil vertically to permit greater pupil movement in the rear of the shield. Hence it will be more practical to select a desired width of strip and provide a temple bar of substantially equal width vertically.

While the drawings show a preferred form of the invention embodying certain minor details, it is to be understood that a broad novel combination is intended to be covered within the scope of the appended claims.

I claim:
1. In a spectacle, in combination, a spectacle frame provided with a pair of main lenses and temple bars, each bar being pivotally secured at its forward end to said frame, a light transmitting element operatively associated with each temple bar, each element being pivotally mounted directly on its respective bar by a double leaf hinge, said hinge having two opposed leaves and a pivot connecting said leaves, one leaf thereof being secured directly at its free end to the outer face of the temple bar closely adjacent to the forward pivoted end thereof and being extended forwardly to position the pivot end thereof in advance of the pivotal point of the temple bar and the transverse plane of the main lenses when the temple bar is in its operative position, said light transmitting element being secured at one end thereof to the other and outermost leaf of said hinge with said element in alignment with the outermost leaf, to permit said element to fold closely adjacent to its respective bar with the bar either in folded position adjacent said frame or with the bar positioned at a right angle to said frame and whereby, with the bar in operative position said element may be moved through an arc of substantially 270 degrees to a position in front of and parallel to the transverse plane of the main lenses.

2. In a spectacle as set forth in claim 1, wherein the light transmitting element is formed as a relatively narrow strip of colored glare shield material whereby to permit a major portion of the main lens to remain uncovered by the element to permit normal vision through the uncovered portion of the lens when the element is in its operative position.

3. In a spectacle as set forth in claim 1, wherein each temple bar is provided with a recess coextensive in length with the associated light transmitting element, said element when in folded position adjacent to the bar being positioned within said recess to lie substantially flush with the outer face of the bar.

4. In a spectacle frame, a pair of main lenses, temple bars pivotally connected to said frame, said bars being relatively wide vertically, a pair of auxiliary lenses pivotally mounted directly on each bar by hinges of the double leaf type, one leaf of each hinge being secured directly at its free end to the outer face of the temple bar closely adjacent to the pivoted end thereof and being extended forwardly to position the pintle end thereof in advance of the transverse plane of the main lenses, the other leaf of each hinge being secured to an auxiliary lens, each auxiliary lens being formed as a relatively narrow strip of material, one of said auxiliary lenses on each bar being formed as a glare shield, the other auxiliary lens on the same bar being formed to correct vision, said auxiliary lenses being movable selectively or in unison to a position in front of a main lens, and being movable to lie close to the outer face of the respective bar, said temple bars having a vertical width sufficient to cover completely both auxiliary lenses on the same bar when the latter lenses are folded thereagainst.

EMANUEL KRIMSKY.

REFERENCES CITED

The following references are of record in the file of this patent:

UNITED STATES PATENTS

| Number | Name | Date |
| --- | --- | --- |
| 1,212 | Smith | June 29, 1839 |
| 648,165 | Falardeau | Apr. 24, 1900 |
| 1,206,457 | Mills | Nov. 28, 1916 |
| 1,564,663 | Kalligan | Dec. 8, 1925 |
| 1,786,204 | Gravitt | Dec. 23, 1930 |
| 1,964,243 | Behr | June 26, 1934 |
| 2,175,896 | Jiranek | Oct. 10, 1939 |
| 2,176,006 | Ehrlich | Oct. 10, 1939 |
| 2,205,764 | Husar | June 25, 1940 |

FOREIGN PATENTS

| Number | Country | Date |
| --- | --- | --- |
| 78,652 | Germany | Mar. 29, 1894 |
| 335,345 | Great Britain | Sept. 25, 1930 |